United States Patent [19]

Ranke et al.

[11] Patent Number: 4,938,783
[45] Date of Patent: Jul. 3, 1990

[54] PROCESS FOR THE PURIFICATION OF CRUDE GASES WITH SIMULTANEOUS PRODUCTION OF SYNTHESIS GAS AND FUEL GAS

[75] Inventors: Gerhard Ranke, Poecking; Horst Weiss, Munich, both of Fed. Rep. of Germany

[73] Assignee: Linde Aktiengesellschaft, Wiesbaden, Fed. Rep. of Germany

[21] Appl. No.: 193,607

[22] Filed: May 13, 1988

[30] Foreign Application Priority Data

May 14, 1987 [DE] Fed. Rep. of Germany ....... 3716199

[51] Int. Cl.$^5$ .............................................. C10K 1/14
[52] U.S. Cl. .................... 48/197 R; 252/373
[58] Field of Search .............. 48/197 R; 252/373; 55/48, 53, 68, 73; 423/605

[56] References Cited

U.S. PATENT DOCUMENTS

| | | | |
|---|---|---|---|
| 4,189,307 | 2/1980 | Marcin | 48/197 R |
| 4,254,094 | 3/1981 | Hegartz | 252/373 |
| 4,515,604 | 5/1985 | Eisenlohr et al. | 48/197 R |
| 4,552,572 | 11/1985 | Galstaun | |
| 4,568,364 | 2/1986 | Galstaun et al. | |

Primary Examiner—Peter Kratz
Attorney, Agent, or Firm—Millen, White & Zelano

[57] ABSTRACT

In a process for the purification of coal gasification gases, synthesis gas and fuel gas are simultaneously produced. In order to obtain a fuel gas rich in $CO_2$, capable of handling fluctuations in demand, and to produce at the same time a highly concentrated $H_2S$ fluid fraction, a portion of the crude gas, scrubbed to synthesis gas purity, is utilized for stripping out $CO_2$ under pressure from scrubbing medium loaded exclusively with $CO_2$. The partially stripped $CO_2$-loaded scrubbing medium is employed for the concentration of sulfur compounds in an $H_2S$/COS-loaded scrubbing medium.

20 Claims, 1 Drawing Sheet

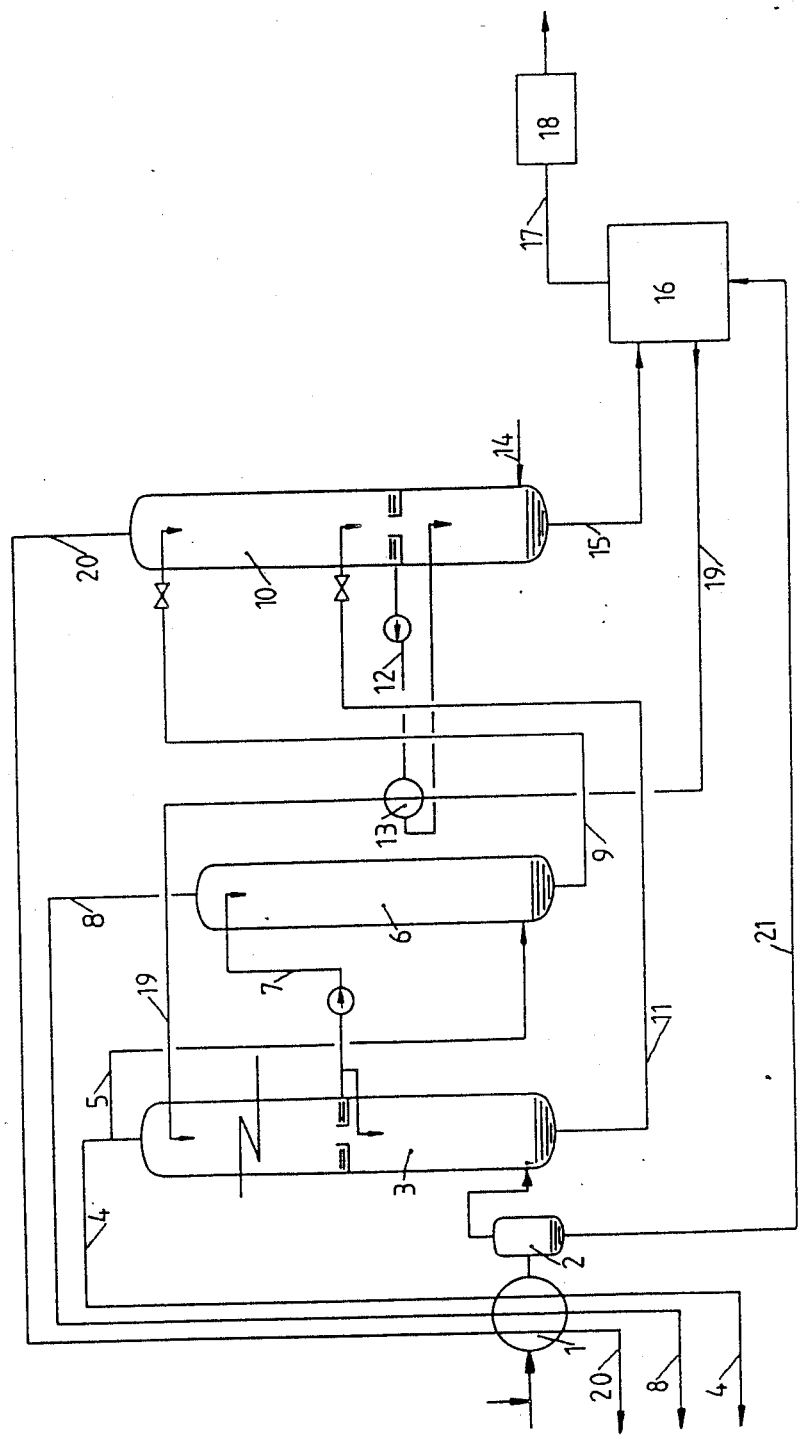

PROCESS FOR THE PURIFICATION OF CRUDE GASES WITH SIMULTANEOUS PRODUCTION OF SYNTHESIS GAS AND FUEL GAS

BACKGROUND OF THE INVENTION

The invention relates to a process and apparatus for the purification of crude gases from a carbonaceous feedstock gasification with simultaneous production of: (1) synthesis gas, (2) $CO_2$-enriched fuel gas suitable for the generation of electrical energy, e.g., by means of a gas turbine, and (3) $H_2S/COS$-rich gas suitable for producing sulfur in a Claus unit. After conversion to the desired $H_2$ to carbon oxide ratio, the crude gas is cooled and, subsequently, $H_2S$ and COS are removed therefrom in a lower section of a scrubbing column using a scrubbing medium previously loaded with $CO_2$. In an upper section of the scrubbing column, $CO_2$ is scrubbed from the crude gas. Purified synthesis gas is discharged from the scrubbing column.

In the gasification of carbonaceous feedstock (e.g., coal, oil, refinery residues), a gaseous mixture is formed comprising preferably $H_2$ and CO, but also containing other components, such as $CO_2$, $H_2S$ and inert gases.

In correspondence with further usage of the gaseous mixture as synthesis gas (e.g., $NH_3$ or methanol synthesis), as a starting compound for obtaining $H_2$ or CO, or as a fuel gas, the hot crude gas, in conventional methods, is first converted in accordance with the marginal range of conditions yielding the required synthesis gas. After conversion, the gas is partially cooled—either in a waste heat boiler for steam generation or by water quenching—and then purified in a two-stage, sour gas scrubbing column. $H_2S$ and COS are removed in a lower column section while $CO_2$ is scrubbed out to the required purity in an upper section. Normally, physical scrubbing techniques are utilized for removal of $CO_2$, $H_2S$ and COS.

A conventional process for the simultaneous production of synthesis gas and fuel gas, the latter being used for generating electrical energy by means of gas turbines, is disclosed in DE-OS 3,427,633. In this process, two crude gas streams are cooled separately. Only the crude gas stream intended for the production of synthesis gas is converted (i.e., reaction of CO with steam to produce $H_2$ and $CO_2$). The gas streams are subsequently scrubbed in two parallel scrubbing columns. During this process, the synthesis gas is first selectively desulfurized in an $H_2S$ scrubbing step and subsequently subjected to a $CO_2$ scrubbing step.

In the conventional process, the excess, $CO_2$-loaded scrubbing agent from the synthesis gas scrubbing stage is utilized for desulfurization of the fuel gas. By virtue of this combination, it is possible to strip out a portion of the $CO_2$, that had been scrubbed out in the synthesis scrubbing stage, and to combine it with the fuel gas without any significant additional expenditure of energy. By this procedure, a savings in compression energy is realized in the subsequent admixture of air with the fuel gas inasmuch as less excess air is required to be mixed with the fuel gas in order to limit the maximum combustion temperature in the gas turbines.

However, despite the advantage of $CO_2$ enrichment in the fuel gas, the conventional process exhibits several substantial drawbacks.

In the $H_2S$ scrubbing step, in addition to $H_2S$ and COS, a large amount of $CO_2$ is scrubbed out as well (in correspondence with the $CO_2$ partial pressure and $CO_2$ solubility). In the usual selective sour gas scrubbing operations, $H_2S$ and COS are concentrated in a downstream enrichment column to such an extent that the $H_2S$ fraction obtained during hot regeneration of the scrubbing medium can be reacted to elemental sulfur in a Claus unit.

However, in the enrichment column, a cold scrubbing medium already loaded with $CO_2$ is needed for retaining $H_2S$ and COS. The cold, $CO_2$-loaded scrubbing medium is used to rescrub the $H_2S$ released together with the $CO_2$ and so as to deliver a sulfur-free residual gas from the $H_2S$ enrichment column. Normally, the excess scrubbing medium for the $CO_2$ scrubbing operation is utilized for this rescrubbing step. However, in the combination disclosed in the above-described conventional method of DE-OS 427,633, there is no available $CO_2$-loaded scrubbing medium. Enrichment of $H_2S$ and COS is therefore impossible. Due to this problem, the sulfur content of the sulfur fraction drops to such a great extent that a Claus unit cannot be employed. Although $H_2S$ from such a gaseous mixture can be reacted to elemental sulfur by means of an oxidative scrubbing step, these scrubbing operations have the disadvantage that COS does not react and thus cannot be scrubbed out. Due to the high COS content of unconverted crude gas (about 4–5% of the sulfur is generally present in the form of COS), significant environmental pollution problems are encountered.

Normally, electric current generation is adapted to demand. Therefore, fluctuations occur on a daily and seasonal basis. For this reason, the amount of fuel gas needed for the generation of electrical energy produced by coal gasification and the like is likewise variable. To avoid load fluctuations of gasification and of the air fractionator, it is normally desirable to operate gasification at a constant rate and to absorb quantitative fluctuations of the required fuel gas in the synthesis gas production. As a prerequisite of this, the quenching, conversion, and the two parallel scrubbing operations must operate under fluctuating marginal conditions, requiring a high expenditure for control means for the operation of the total installation.

Both lines (gas cooling, conversion, and both sour gas scrubbing stages) must be designed for the respectively maximum amount of gas. Therefore, both lines are oversized and normally do not operate at optimum operating conditions. At the same time, over-dimensioning entails higher initial investment costs.

SUMMARY OF THE INVENTION

An object of one aspect of this invention is to structure a process for the purification of crude gases with simultaneous production of synthesis gas and fuel gas in such a way that, a $CO_2$-enriched fuel gas is obtained while simultaneously producing a highly concentrated $H_2S$ fraction, and the response to fuel gas demand is facilitated.

An object of another aspect of this invention is to provide apparatus for conducting the process.

Upon further study of the specification and appended claims, further objects and advantages of this invention will become apparent to those skilled in the art.

The process aspect of the invention is attained according to the invention by delivering a branched-off portion of synthesis gas, produced by a scrubbing step, to a stripping step wherein the portion of synthesis gas is used to strip $CO_2$ from a scrubbing medium, loaded essentially with $CO_2$, discharged from the scrubbing step, removing $CO_2$-enriched fuel gas from said stripping step and delivering partially stripped scrubbing medium, loaded essentially with $CO_2$, to an $H_2S$ enrichment column.

According to another aspect, the process of the invention is performed by branching-off a portion of the obtained synthesis gas and utilizing this portion for stripping out $CO_2$ under pressure from scrubbing medium removed from the upper column section of the scrubbing column. This scrubbing medium is loaded essentially with $CO_2$. A $CO_2$-enriched fuel gas is obtained as a product of the $CO_2$ stripping step. The partially stripped scrubbing medium, also loaded essentially with $CO_2$, is subsequently used to concentrate sulfur compounds in an $H_2S$ enrichment column.

Suitable scrubbing media are methanol, ethanol, acetone, N-methylpyrrolidone (NMP), dimethylformamide (DMF), propylene carbonate, polyethylene glycol dialkyl ethers as well as mixtures thereof.

Due to this procedure of the invention, the fuel gas is enriched with $CO_2$, and, at the same time, the partially stripped scrubbing medium loaded solely with $CO_2$ is made available for the $H_2S$ enrichment column. The branched-off synthesis gas contains little if any sulfur compounds and the stripped-out $CO_2$ withdraws the heat of solution from the scrubbing medium whereby the latter is cooled off. As seen from the viewpoint of a cold value balance, stripping off $CO_2$ under pressure is equivalent to expansion of the loaded scrubbing medium and concomitant partial vaporization of $CO_2$, as employed in the conventional methods.

An additional advantage resides in that the crude gas production, conversion and sour gas scrubbing step can be performed under constant conditions while only the stripping column is charged with a variable amount of synthesis gas.

According to the invention, conversion, though not required for obtaining fuel gas, is still needed for the production of, for example, $H_2$, methanol or $NH_3$ synthesis gas. For this reason, conversion is performed prior to cooling the crude gas.

In a further development of the invention, a portion of the crude gas can be branched-off prior to conversion and subjected, unconverted, to sour gas scrubbing. This procedure is utilized with preference either if, for further processing, an unconverted gas is required in addition to the fuel gas, for example for obtaining pure CO, or if no great load fluctuations of the fuel gas are expected, for example if the electrical energy, obtained by means of gas turbines, is required only for synthesis gas production and further processing of the crude gas (i.e., a self-sufficient plant).

In another modification of the process aspect of the invention, a portion of the crude gas is branched-off, prior to conversion, and desulfurized. The desulfurized, unconverted crude gas is then employed for stripping out $CO_2$.

Normally, stripping of $CO_2$ is performed under the pressure of the scrubbing column. Another embodiment of the process according to this invention, however, provides that, in cases where the synthesis gas production, i.e., conversion and scrubbing, on account of the subsequent synthesis, is conducted under a pressure higher than the required pressure for the combustion chamber, the branched-off synthesis gas is engine-expanded in an expansion turbine to the pressure of the combustion chamber upstream of the $CO_2$ stripping column. The $CO_2$ stripping step is carried out, in this case, at a reduced pressure.

In accordance with a special embodiment of the process of this invention, it is possible to use also other gases fulfilling certain marginal conditions, in addition to the fuel gas, during the stripping out of $CO_2$ under pressure. For example, purge gases from methanol synthesis, residual gases from a nitrogen scrubbing stage, or $N_2$ from an air fractionator can be employed, individually or combined, during stripping.

According to the invention, the concentration of sulfur compounds takes place in an $H_2S$ enrichment column by rescrubbing the liberated $H_2S/COS$ with scrubbing medium loaded with $CO_2$ obtained from the $CO_2$ stripping column. The $H_2S/COS$ is thereby enriched in the bottoms of the $H_2S$ enrichment column. $N_2$ or another suitable gas is utilized for stripping out $CO_2$ from the scrubbing medium.

With special advantage, the cold scrubbing medium is withdrawn, in this process, as a side stream from an upper section of the enrichment column and, after being heated against regenerated scrubbing medium, is reintroduced into the column in a lower section.

Furthermore, the $H_2S$-loaded scrubbing medium is subjected to hot regeneration for obtaining a gaseous fraction, rich in $H_2S/COS$, and regenerated scrubbing medium for the scrubbing column.

In a further development of this invention, the residual gas—preferably $CO_2$ and $N_2$, but essentially free of $H_2S$—obtained in the enrichment column is, after being heated against the crude feed gas, compressed together with the combustion air, and admixed with the fuel gas upstream of the combustion chamber.

In this connection, a special advantage resides in that less gas needs to be compressed for lowering the combustion temperature in the combustion chamber, since $CO_2$ has a higher specific heat than air.

A further advantage lies in that no scrubbing medium vapor emission problems occur due to the recycling inasmuch as the residual gas is saturated with scrubbing medium vapor in correspondence with pressure and temperature.

Normally, it is practical from an economic viewpoint and also on account of local antipollution requirements to expand the loaded scrubbing medium to an intermediate pressure and to return the resultant flash gases (preferably $H_2$ and CO), after compression, into the crude gas. In the admixing of the residual gas with the fuel gas, according to a further embodiment of the idea of this invention, it is of advantage that the intermediate expansion tanks and the recycle compressor are eliminated inasmuch as the combustible components are likewise combusted.

According to the apparatus aspect of the invention, the apparatus comprises a scrubbing column, a $CO_2$ stripping column, and an $H_2S$ enrichment column, wherein, from a conduit removing synthesis gas from the scrubbing column, a second conduit is branched-off and leads into the lower section of the $CO_2$ stripping column.

The scrubbing column is preferably connected to the $CO_2$ stripping column in such a way that a conduit for $CO_2$-loaded scrubbing medium leads from the upper portion of the scrubbing column to the stripping column. The stripping column is preferably connected by a bottom conduit with the enrichment column whereby partially stripped scrubbing medium is delivered to the latter. Also, it is preferred that a conduit for scrubbing medium rich in $H_2S/COS$ leads from the lower section of the scrubbing column to the enrichment column, and that a conduit leads from the bottom of the enrichment column to a hot scrubbing medium regenerator. A Claus unit is preferably in communication with the hot regenerator. Also, a heat exchanger is preferably connected to a conduit leading from the regenerator to the upper section of the scrubbing column. The heat exchanger is preferably further connected to a conduit extending laterally out of the enrichment column.

BRIEF DESCRIPTION OF THE DRAWINGS

Various other objects, features and attendant advantages of the present invention will be more fully appreciated as the same becomes better understood when considered in conjunction with the accompanying drawings, wherein:

FIG. 1 illustrates a system for performing the process of the invention.

DETAILED DESCRIPTION OF THE DRAWINGS

A crude gas containing $H_2$ and CO, but also $CO_2$, $H_2S$, COS and inert gases, is cooled off, after adding a small amount of methanol, in a heat exchanger 1 and introduced by way of a methanol/$H_2O$ separator 2 into the lower section of a scrubbing column 3. In the scrubbing column, the crude gas is freed of $CO_2$ and $H_2S/COS$ by being sprayed with methanol fed via conduit 19 which absorbs the impurities. The thus-obtained synthesis gas is withdrawn from the scrubbing column via a conduit 4. A portion is branched-off and conducted via a conduit 5 into the lower section of a $CO_2$ stripping column 6. Methanol loaded with $CO_2$ is withdrawn from the side of the scrubbing column and conducted via a conduit 7 into the upper section of the $CO_2$ stripping column 6 where the branched-off synthesis gas is utilized for stripping out $CO_2$. The resultant $CO_2$-enriched fuel gas is conducted via a conduit 8 into a combustion chamber (not shown) wherein it is used as fuel for driving a gas turbine (not shown) to produce electrical energy.

A portion of the $CO_2$-loaded methanol removed via conduit 7 is returned to a lower section of the scrubbing column for scrubbing out $H_2S/COS$ from the crude gas. The cold, partially stripped, $CO_2$-loaded methanol is discharged from the stripping column by way of a conduit 9. In an $H_2S$ enrichment column 10, this scrubbing medium serves for rewashing the $H_2S/COS$ released in this column from the scrubbing medium loaded with $H_2S/COS$ which was introduced via conduit 11 from the scrubbing column; thereby, the $H_2S/COS$ is concentrated in the bottoms of the $H_2S$ enrichment column 10. Laterally of the enrichment column, the cold methanol is withdrawn and conducted via a conduit 12 to a heat exchanger 13 where it is heated in heat exchange with regenerated methanol. Thereafter, the withdrawn methanol is reintroduced to the enrichment column in the lower section thereof. By way of a conduit 14, $N_2$ is introduced into the lower section of the enrichment column, where the $N_2$ strips out $CO_2$ from the methanol, which is additionally loaded with $H_2S/COS$. The methanol is conducted from the bottom of the enrichment column via conduit 15 into a hot regenerator 16. The methanol/$H_2O$ condensate from separator 2 is furthermore introduced into the hot regenerator 16 via conduit 21. From the hot regenerator 16, a conduit 17 conducts the $H_2S/COS$-rich gas into a Claus unit 18, and a conduit 19 conducts regenerated methanol back to the scrubbing column 3. Residual gas which contains $CO_2$ and $N_2$ is removed from the enrichment column 10 by way of conduit 20.

The quantities and compositions of materials converted in an exemplary process, as well as several pressures and temperatures, are compiled in the product balance of the table below.

TABLE

| | Product Balance | | | | | | | | |
|---|---|---|---|---|---|---|---|---|---|
| Reference Numeral Type of Material | 1 Crude Gas | 4 Synthesis Gas | 7 $CH_3OH$ | 8 Fuel Gas | 14 Stripping Gas | 17 Sour Gas | 19 $CH_3OH$ | 20 Residual Gas | 11 $CH_3OH$ |
| Components, vol % | | | | | | | | | |
| $H_2$ | 56.6 | 96.9 | | 82.0 | | | | 0.2 | |
| $N_2$ + CO + $CH_4$ | 1.9 | 3.1 | | 2.6 | 100.0 | 2.0 | | 10.1 | |
| $CO_2$ | 40.8 | 10 ppm | | 15.4 | | 64.3 | | 89.7 | |
| $H_2S/COS$ | 0.7 | 0.1 ppm | | 1 ppm | | 33.7 | | 10 ppm | |
| Amount, $Nm^3/h$ | 100,000 | 24,620 | 62 t/h plus dissolved compon. | 39,860 | 3,750 | 2,180 | 125 t/h plus dissolved compon. | 37,090 | 63 t/h plus diss. comp. |
| Pressure, bar | 58 | 56 | | 55 | 4 | 2 | | 1.1 | |
| Temperature, °C. | 35 | 25 | | 25 | 20 | 30 | | 25 | |

The gas flow and composition of the crude gas depend mainly on the further usage of the synthesis gas. The most important syntheses, which are combined with partial oxidation of coal or heavy hydrocarbons (oil, residuals, tar) are ammonia production, normally combined with the production of urea, methanol production sometimes combined with the production of acetic acid (i.e additional production of CO), oxoalcohol production, synthetic natural gas (SNG) production and hydrogen production for refineries. The composition of the crude gas depends on the further processing and varies mainly in the degree of CO-conversion, e.g. for the production of ammonia and hydrogen, a nearly complete conversion of CO to hydrogen and $CO_2$ is sought to be attained, whereas for alcohol synthesis a certain ratio of $H_2$: CO is required.

The amount of crude gas depends on the expected amount of product and can vary between 10.000 $Nm^3/h$ (10 MMSCFD) for oxoalcohol production and 350.000 $Nm^3/h$ (313 MMSCFD) for ammonia or SNG production. To this the required amount of fuel gas has to be added.

The operation pressure of the scrubbing column and the stripping column depends on the type of gasification and the pressure of the synthesis. A usual pressure range will be 10 to 150 bar, especially 20 to 100 bar. The $H_2S$ enrichment column is usually operated at 1,5 to 5 bar.

The operating temperature depends mainly on the feed gas pressure and composition and can vary between ambient temperature and −90° C. in the scrubbing column, the stripping column and the H$_2$S enrichment column being operated at colder temperatures. In order to compensate for the loss of cold within the process, a refrigerant unit is used working in the temperature range between 20 and −50° C.

Normally it is desired to process the acid gas obtained from the regenerator in a Claus unit to produce elemental sulfur. This means, that the acid gas should have a H$_2$S concentration of at least 20 mol%. In principle, it is also possible to process a H$_2$S containing gas stream in an oxidative sulfur wash system. Such a process can be of interest if a very small crude gas flow has to be processed, if the crude gas contains only a very low H$_2$S content or if the crude gas contains heavier hydrocarbons, as is usual in low temperature coal gasification. The amount of CO$_2$ in the fuel gas depends on the amount in feed gas.

In general the acid gas removal unit has to be adapted to the conditions of the overall plant and especially to the changes on the fuel gas demand. The proposed process is very flexible and can be adapted to the different demands and conditions.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the purification of a crude gas produced from gasification of carbonaceous feedstock and simultaneous production of (a) synthesis gas, (b) CO$_2$-enriched fuel gas, and (c) a fluid rich in H$_2$S and COS comprising: subjecting said crude gas to a conversion step; cooling the converted crude gas; removing H$_2$S and COS in a lower section of a scrubbing column by scrubbing the converted crude gas with a scrubbing medium previously loaded with CO$_2$ and removing CO$_2$ in an upper section of said scrubbing column; discharging purified synthesis gas from said scrubbing column; branching-off a portion of said purified synthesis gas; utilizing said portion of synthesis gas, in a stripping column under pressure, to strip CO$_2$ from scrubbing medium discharged from said upper section, said scrubbing medium being loaded essentially with CO$_2$; removing a CO$_2$-enriched fuel gas from said stripping column; removing a partially stripped scrubbing medium loaded essentially with CO$_2$ from said stripping column; and employing said partially stripped scrubbing medium in an H$_2$S enrichment column to concentrate sulfur compounds in a stream of said scrubbing medium.

2. A process according to claim 1, wherein a portion of said crude gas is branched-off, prior to conversion, and desulfurized, unconverted, in a preliminary scrubbing column and delivering the resultant desulfurized, unconverted gas to said stripping column to strip out CO$_2$ from said scrubbing medium.

3. A process according to claim 1, wherein said scrubbing medium is methanol, ethanol, acetone, N-methylpyrrolidone, dimethylformamide, propylene carbonate, a polyethylene glycol dialkyl ether or mixtures thereof.

4. A process according to claim 1, wherein said scrubbing medium is cooled before being introduced into said upper section of said scrubbing column.

5. A process according to claim 1, wherein the branched-off portion of said synthesis gas is engine-expanded, upstream of the CO$_2$ stripping column, in an expansion turbine to a pressure at which a downstream combustion chamber operates, said combustion chamber utilizing the CO$_2$-enriched fuel gas discharged from said stripping column.

6. A process according to claim 1, wherein other gases, in addition to stripped-out CO$_2$, are admixed into the fuel gas during the stripping step.

7. A process according to claim 6, wherein said other gases are purge gases from a methanol synthesis, residual gases from a nitrogen scrubbing stage, N$_2$ from an air fractionator or mixtures thereof.

8. A process according to claim 1, wherein the concentration of sulfur compounds in said H$_2$S enrichment column is conducted by rewashing H$_2$S and COS, released together with CO$_2$ by stripping in said H$_2$S enrichment column, with cold partially stripped CO$_2$-loaded scrubbing medium discharged from said stripping column.

9. A process according to claim 1, wherein cold scrubbing medium is withdrawn from an upper section of said H$_2$S enrichment column and, after being heated by heat exchange with regenerated scrubbing medium, is introduced into a lower section of said H$_2$S enrichment column.

10. A process according to claim 1, wherein N$_2$ is used in the H$_2$S enrichment column as a stripping gas to strip out CO$_2$ from said scrubbing medium.

11. A process according to claim 1, wherein H$_2$S-loaded scrubbing medium, discharged from said H$_2$S enrichment column, is subjected to hot regeneration to obtain regenerated scrubbing medium and a gas fraction rich in H$_2$S and COS.

12. A process according to claim 1, wherein a residual gas, discharged from said H$_2$S enrichment column, is heated by heat exchange with said crude gas, compressed together with combustion air and admixed with said fuel gas upstream of a combustion chamber.

13. A process according to claim 1, further comprising utilizing said CO$_2$-enriched fuel gas to drive a gas turbine for the generation of electrical energy.

14. A process according to claim 11, further comprising utilizing said gas fraction rich in H$_2$S and COS in a Claus reactor unit to obtain sulfur.

15. A process according to claim 1, wherein the conversion step and scrubbing step are conducted under substantially constant conditions.

16. A process according to claim 1, wherein the stripping step and scrubbing step are performed under substantially the same pressure 17. A process according to claim 1, wherein the scrubbing step is conducted under a pressure higher than the pressure of the stripping step.

18. A process according to claim 1, wherein scrubbing medium loaded with H$_2$S and COS is removed from said lower section of the scrubbing column and delivered to said H$_2$S enrichment column.

19. A process according to claim 1, wherein a portion of said scrubbing medium discharged from the upper section of said scrubbing column is, prior to delivery of the scrubbing medium to said stripping column, introduced into said lower section of said scrubbing column.

20. In a process for the purification of a crude gas produced from gasification of carbonaceous feedstock and simultaneous production of (a) synthesis gas, (b) CO$_2$-enriched fuel gas, and (c) a fluid rich in H$_2$S and COS comprising the steps of converting, cooling and scrubbing said crude gas, wherein the improvement comprises:

delivering a branched-off portion of synthesis gas, produced by said scrubbing step, to a stripping step wherein said portion of synthesis gas is used to strip $CO_2$ from a scrubbing medium, loaded essentially with $CO_2$, discharged from said scrubbing step, removing $CO_2$-enriched fuel gas from said stripping step and delivering partially stripped scrubbing medium, loaded essentially with $CO_2$, to an $H_2S$ enrichment column.

* * * * *